(12) United States Patent
Ishii et al.

(10) Patent No.: US 7,783,295 B2
(45) Date of Patent: Aug. 24, 2010

(54) CALL ADMISSION CONTROL DEVICE, AND CALL ADMISSION CONTROL METHOD

(75) Inventors: Hiroyuki Ishii, Yokosuka (JP); Akihito Hanaki, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 808 days.

(21) Appl. No.: 11/605,351

(22) Filed: Nov. 29, 2006

(65) Prior Publication Data

US 2007/0135131 A1    Jun. 14, 2007

(30) Foreign Application Priority Data

Dec. 8, 2005    (JP) .............................. 2005-355289

(51) Int. Cl.
 *H04Q 11/00*    (2006.01)
(52) U.S. Cl. ..................... 455/453; 455/452.1; 455/423; 455/509; 455/515; 455/115.3; 370/230; 370/232; 370/234; 370/318; 370/395.2
(58) Field of Classification Search ................ 455/453, 455/452.1, 423, 522, 515, 115.3, 509; 370/230, 370/232, 234, 318, 395.2
See application file for complete search history.

(56) References Cited

U.S. PATENT DOCUMENTS 6,519,461 B1 *  2/2003  Andersson et al. .......... 455/453
6,889,050 B1 *  5/2005  Willars et al. ............ 455/452.2

(Continued)

FOREIGN PATENT DOCUMENTS

EP    1 021 001 A2    7/2000

(Continued)

OTHER PUBLICATIONS

3GPP, "3rd Generation Partnership Project; Technical Specification Group Radio Access Network; Physical layer aspects of UTRA High Speed Downlink Packet Access (Release 4)," 3GPP TR 25.848 V4.0.0(Mar. 2001).

(Continued)

*Primary Examiner*—Charles N Appiah
*Assistant Examiner*—William F Rideout
(74) *Attorney, Agent, or Firm*—Crowell & Moring LLP (57) ABSTRACT

When n mobile stations performing communications using a shared channel and m mobile stations performing communications using a dedicated channel are used in a mixed manner, necessary radio resources to satisfy the transmission data rate aimed by a mobile station performing communications using a shared channel are calculated, the quality of the shared channel is guaranteed, and call admission control of a dedicated channel is performed. An HS terminal allocation power calculation unit calculates necessary transmission power to satisfy the target transmission data rate by n mobile stations based on the radio channel quality and the target transmission data rate of the n mobile stations using a shared channel. Call admission of a mobile station newly performing communications using a dedicated channel is controlled based on the necessary transmission power to satisfy the target transmission data rate by n mobile stations using a shared channel, the initial transmission power of a mobile station newly starting communications using a dedicated channel, and the transmission power of m mobile stations using a dedicated channel.

7 Claims, 7 Drawing Sheets

U.S. PATENT DOCUMENTS

| | | | |
|---|---|---|---|
| 2002/0147015 A1* | 10/2002 | Hamabe | 455/442 |
| 2003/0210660 A1 | 11/2003 | Wiberg et al. | |
| 2004/0209624 A1* | 10/2004 | Rune et al. | 455/453 |
| 2005/0107091 A1 | 5/2005 | Vannithamby et al. | |

FOREIGN PATENT DOCUMENTS

| | | |
|---|---|---|
| EP | 1 453 225 A1 | 9/2004 |
| JP | 2003-143653 A | 5/2003 |
| JP | 2005-525743 A | 8/2005 |

OTHER PUBLICATIONS

European Search Report dated Mar. 8, 2007 (Six (6) pages).

* cited by examiner

WHEN NUMBER OF CODES THAT CAN BE ALLOCATED TO THE HS-PDSCH = 1

| CQI VALUE | Rn |
|---|---|
| 1 | 137 |
| 2 | 173 |
| 3 | 233 |
| 4 | 317 |
| 5 | 377 |
| ... | ... |
| 29 | 1405 |
| 30 | 1405 |

WHEN NUMBER OF CODES THAT CAN BE ALLOCATED TO THE HS-PDSCH = 2

| CQI VALUE | Rn |
|---|---|
| 1 | 137 |
| 2 | 173 |
| 3 | 233 |
| 4 | 317 |
| 5 | 377 |
| ... | ... |
| 29 | 2825 |
| 30 | 2825 |

...

WHEN NUMBER OF CODES THAT CAN BE ALLOCATED TO THE HS-PDSCH = 15

| CQI VALUE | Rn |
|---|---|
| 1 | 137 |
| 2 | 173 |
| 3 | 233 |
| 4 | 317 |
| 5 | 377 |
| ... | ... |
| 29 | 24222 |
| 30 | 25558 |

FIG. 6

CALL ADMISSION CONTROL DEVICE, AND CALL ADMISSION CONTROL METHOD

BACKGROUND OF THE INVENTION

1. Field of the Invention

The present invention relates to a call admission control device, and call admission control method, and more specifically to a call admission control device and a call admission control method for controlling the admission of a call in a mobile communication system where dedicated channels and shared channels are mixed.

2. Description of the Related Art

A mobile telephone communication system performs a communication using finite resources (frequencies and power), and there is the upper limit to the communication capacity. Therefore, it is necessary to limit the number of mobile stations in a cell depending on the communication capacity. Practically, when a new mobile station starts communications in the cell, it is necessary to judge whether or not the new mobile station can start a communication in the cell. The control is referred to as call admission control. The status in which a new mobile station cannot start a communication in the cell, that is, the status in which the communication capacity is being used substantially 100%, is referred to as a capacity limit.

The call admission control in the W-CDMA (wideband-code division multiple access) of the third generation mobile communication system is explained below.

In the release 99 system of the W-CDMA, a one-to-one communication channel which is called a dedicated channel is set between a radio base station and a mobile station, and communications are performed using the dedicated channel. In this case, with an increasing number of mobile stations performing communication with the radio base station, consumed power resources, code resources, etc. increase. Thus, in the release 99 system in the W-CDMA system, call admission control is performed normally based on power resources, code resources, and baseband resources, etc. in a radio base station.

Described below as an example is a case in which the call admission control is performed based on the power resources. For example, 43 dBm is set as the maximum transmission power of a radio base station, and 42.5 dBm is set as a threshold value for call admission. The difference of 0.5 dB is a margin for keeping the transmission power of a radio base station below the maximum transmission power. When there is a mobile station which is newly starting communications in a corresponding cell, and if the transmission power of a radio base station at the time point is 40 dBm, then there are sufficient power resources. Therefore, the communication of the mobile station is admitted. On the other hand, if there is a mobile station which is newly starting communications in a corresponding cell, and if the transmission power of a radio base station at the time point is 42.6 dBm, then it is determined there are not sufficient power resources, and the communication of the mobile station is not admitted. The transmission power of above-mentioned radio base station is constituted by, for example, the transmission power of common channels such as a CPICH (common pilot channel), a PCCPCH (primary common control physical channel), SCH, etc., the transmission power of a dedicated channel set between a radio base station and each mobile station, etc.

On the other hand, in the release 5 system of the W-CDMA, in addition to a dedicated channel set one to one between a radio base station and a mobile station, one or more than two shared channels is set for a plurality of mobile stations that share one large channel. The communication system using the shared channels is called high speed downlink packet access (HSDPA), and is a downlink high speed packet transmission system capable of transmitting high-speed and large-capacity traffic (refer to 3GPP TR25.848v4.0.0, for example). That is, the release 5 system in the W-CDMA system contains in a mixed manner the above-mentioned communication using shared channels and communication using dedicated channels.

In the above-mentioned system containing in a mixed manner a communication using dedicated channels and a communication using shared channels, it is necessary to share radio resources such as power resources and code resources between the dedicated channels and the shared channels.

For example, there can be a method of equally dividing available radio resources such as power resources, code resources, etc., and allocating the divided resources to the dedicated channels and the shared channels.

There is also a method of first allocating radio resources such as power resources, code resources, etc. to dedicated channels, and then allocating the remaining radio resources to shared channels.

Since the communication system using shared channels performs communications using available radio resources as much as possible, the radio resource can be more efficiently applied in the latter example in the above-mentioned two examples.

However, in the above-mentioned method of allocating radio resources such as power resources, code resource, etc. first to dedicated channels, and then allocating remaining radio resources to shared channels, there is a problem that the radio resources to be allocated to the shared channels are reduced when there is an increasing number of mobile stations for performing communications using the dedicated channels.

JP2005-525743A (hereinafter referred to as patent document 1) describes the technique of managing radio resources relating to the communications performed using dedicated channels and high-speed shared channels. JP2003-143653A (hereinafter referred to as patent document 2) describes the technique of controlling the transmission data rate of shared channels when the increase or decrease of the number of dedicated channels is detected.

As described above, there is a method of performing call admission control based on the remaining amount of radio resources such as power resources, code resource, etc. as a method of controlling call admission in a mobile communication system containing in a mixed manner dedicated channels and shared channels. As a method of allocating the radio resources, there is a method of first allocating the radio resources to dedicated channels, and then allocating the remaining radio resources to shared channels.

However, in the conventional call admission control method, there is the problem that radio resources to be allocated to shared channels are reduced when there is an increasing number of mobile stations performing communications using dedicated channels. When the radio resources to be allocated to the shared channels are considerably reduced, the transmission data rate of the mobile stations performing communications using the shared channels is conspicuously reduced, which is not desired from the viewpoint of services. The problem cannot be solved in the techniques described in the patent document 1 or 2.

SUMMARY OF THE INVENTION

The present invention has been developed to solve the above-mentioned problems of the conventional technology, and the objective of the invention is to provide an apparatus and a method for performing call admission control capable of controlling dedicated channels while reserving the quality of the shared channels by calculating necessary radio resources for a mobile station performing communications using shared channels to satisfy a target transmission data rate, and admitting a call with the calculated radio resources taken into account.

The call admission control device according to an embodiment of the present invention is a call admission control device which admits calls from a plurality of mobile stations that perform communications using at least one of a shared channel and a dedicated channel, reserves a necessary radio resource for the shared channel, and controls admission of a call from a new mobile station. A call admission control capable of controlling a dedicated channel is performed while reserving the quality of the shared channel by admitting a call with the radio resources taken into account.

The call admission control device and the necessary radio resource for the shared channel in an embodiment is required for mobile stations which are performing communications using a shared channel to satisfy a predetermined target transmission data rate. In the mobile communication system containing in a mixed manner the communications using shared channels and the communications using dedicated channels, call admission control can be performed while reserving necessary radio resources to satisfy the transmission data rate aimed by mobile stations performing communications using shared channels, thereby maintaining the quality of the mobile stations performing the communications using the shared channels.

Figure 4:
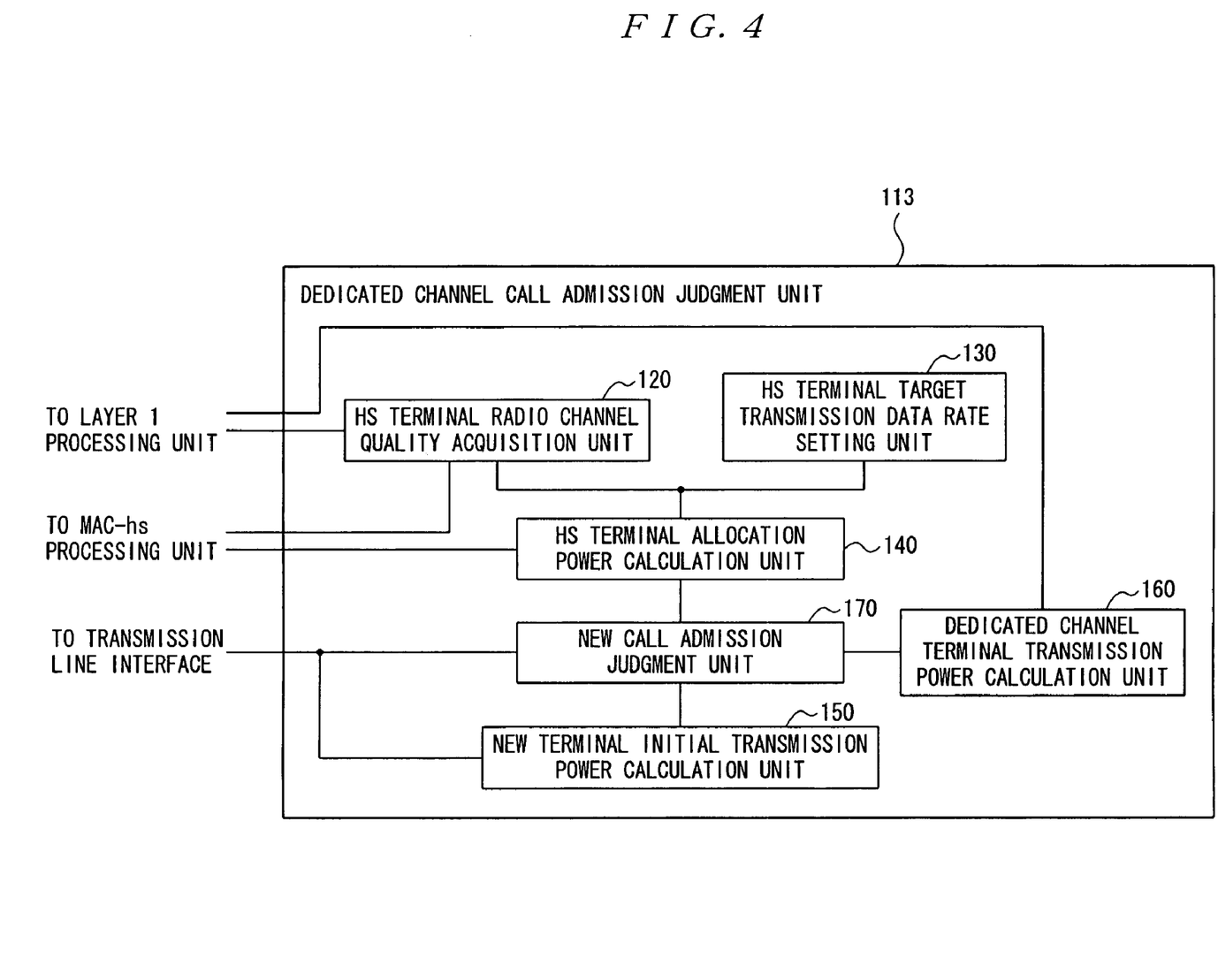
FIG. 4 is a block diagram showing an example of the configuration of the functions of the dedicated channel call admission judgment unit shown in FIG. 3.

The call admission control device according to an embodiment of the present invention is a call admission control device in a mobile communication system which contains in a mixed manner n (n is an integer of 2 or higher, which is common in all descriptions below) mobile stations performing communications using shared channels and m (m is an integer of 2 or higher, which is common in all descriptions below) mobile stations performing communications using dedicated channels, including:

radio channel quality acquisition means (for example, corresponding to the HS terminal radio channel quality acquisition unit 120 shown in FIG. 4) for acquiring values indicating radio channel quality of the n mobile stations performing communications using the shared channels;

target transmission data rate setting means (for example, corresponding to the HS terminal target transmission data rate setting unit 130 shown in FIG. 4) for setting target transmission data rates of the n mobile stations performing communications using the shared channels;

necessary transmission power calculation means (for example, corresponding to the HS terminal allocation power calculation unit 140 shown in FIG. 4) for calculating necessary transmission power for the n mobile stations performing communications using the shared channels to satisfy the target transmission data rate based on the value indicating the radio channel quality of the n mobile stations performing communication using the shared channels and the target transmission data rates;

initial transmission power setting means (for example, corresponding to the new terminal initial transmission power calculation unit 150 shown in FIG. 4) for setting initial transmission power of a mobile station which newly starts communications using a dedicated channel;

dedicated channel transmission power acquisition means (for example, corresponding to the dedicated channel terminal transmission power calculation unit 160 shown in FIG. 4) for acquiring transmission power of the m mobile stations performing communications using the dedicated channels; and new mobile station admission means (for example, corresponding to the new call admission judgment unit 170 shown in FIG. 4) for controlling admission of a call from a mobile station which is newly performing communications using dedicated channels based on the necessary transmission power for the n mobile stations performing communication using the shared channels to satisfy the target transmission data rates, the initial transmission power of the mobile station which is newly starting communications using the dedicated channel, and the transmission power of the m mobile stations performing communications using the dedicated channels. Thus, the call admission control can be appropriately performed.

The call admission control device and the necessary transmission power calculation means in an embodiment calculates by $P_{HS\_req}=\text{Power\_available}\times\Sigma(_{target}R^{(connect)}/Rn)+\text{Power}_{HS-SCCH}$ the necessary transmission power $P_{HS\_req}$ for the n mobile stations to attain the target transmission data rate based on the value Rn indicating the radio channel quality of the n mobile stations, a target transmission data rate $_{target}R^{(connect)}$ of the n mobile stations, power Power_available that can be allocated to the shared channel, and transmission power $\text{Power}_{HS-SCCH}$ of a control channel for the shared channel. Thus, the call admission control can be appropriately performed.

The call admission control device and the necessary transmission power calculation means in an embodiment calculates by $P_{HS\_req}=\text{Power\_available}\times\Sigma(_{target}R^{(connect)}/Rn\times\text{Prob}_n)+\text{Power}_{HS-SCCH}$ the necessary transmission power $P_{HS\_req}$ for the n mobile stations to attain the target transmission data rate based on the value Rn indicating the radio channel quality of the n mobile stations, a time rate $\text{Prob}_n$ at which data to be transmitted to the mobile station n, a target transmission data rate $_{target}R^{(connect)}$ of the n mobile stations, power Power_available that can be allocated to the shared channel, and transmission power $\text{Power}_{HS-SCCH}$ of a control channel for the shared channel. Thus, the call admission control can be appropriately performed.

The call admission control device and the new mobile station admission means in an embodiment admits a mobile station which is newly performing communications using the dedicated channel based on a comparison result between a predetermined threshold value and a sum $P_{comon}+P_{HS\_req}+\text{Power}_{DPCH}+P_{initial}$ of necessary transmission power $P_{HS\_req}$ for the n mobile stations to attain the target transmission data rate, initial transmission power $P_{initial}$ of a mobile station which is newly starting communications using a dedicated channel, a total value $\text{Power}_{DPCH}$ of transmission power of m mobile stations performing communications using the dedicated channel, and a total value $P_{comon}$ of transmission power of a common channel. Thus, if control is performed such that a call from a mobile station which is newly performing communications using a dedicated channel is admitted when $P_{comon}+P_{HS\_req}+\text{Power}_{DPCH}+P_{initial}$ is lower than a predetermined threshold value, and a call from a mobile station which is newly performing communications using a dedicated channel is not admitted when $P_{comon}+P_{HS\_req}+\text{Power}_{DPCH}+P_{initial}$ is equal to or higher than a predetermined threshold value, then the call admission control can be appropriately performed.

The call admission control device and the value indicating the radio channel quality in an embodiment is a transmission data rate at which it is estimated that a transmission can be performed at a predetermined error rate from radio channel quality of a downlink and a power resource and a code resource in the downlink. By considering the transmission data rate, the call admission control can be appropriately performed.

The call admission control device and the target transmission data rate setting means in an embodiment sets a target transmission data rate of the n mobile stations depending on at least one of each service type, each contract type, each terminal type, each user, each cell, each priority class. By considering them, the call admission control can be appropriately performed.

The call admission control device and the new mobile station admission means in an embodiment sets the predetermined threshold value based on a ratio of the dedicated channel to the shared channel. Thus, the call admission control can be appropriately performed.

The call admission control method according to an embodiment is a call admission control method for use in a mobile communication system which contains in a mixed manner n (n is an integer of 2 or higher, which is common in all descriptions below) mobile stations performing communications using a shared channel and m (m is an integer of 2 or higher, which is common in all descriptions below) mobile stations performing communications using a dedicated channel, including:

a step (for example, corresponding to step S2 shown in FIG. 7) of acquiring a value indicating a radio channel quality of the n mobile stations performing communications using the shared channel;

a step (for example, corresponding to step S3 shown in FIG. 7) of setting a target transmission data rate of the n mobile stations performing communications using the shared channel;

a step (for example, corresponding to step S4 shown in FIG. 7) of calculating necessary transmission power for the n mobile stations performing communications using the shared channel to satisfy the target transmission data rate based on the value indicating the radio channel quality of the n mobile stations performing communication using the shared channel and the target transmission data rate;

a step (for example, corresponding to step S5 shown in FIG. 7) of setting initial transmission power of a mobile station which newly starts communications using a dedicated channel;

a step (for example, corresponding to step S6 shown in FIG. 7) of acquiring transmission power of the m mobile stations performing communications using the dedicated channel; and a step (for example, corresponding to steps S7 to S11 shown in FIG. 7) of controlling admission of a call from a mobile station which is newly performing communications using a dedicated channel based on the necessary transmission power for the n mobile stations performing communication using the shared channel to satisfy the target transmission data rate, the initial transmission power of the mobile station which is newly starting communications using the dedicated channel, and the transmission power of the m mobile stations performing communications using the dedicated channel. In the mobile communication system containing in a mixed manner the communications using a shared channel and the communications using a dedicated channel, call admission control can be performed while reserving necessary radio resources to satisfy the transmission data rate aimed by a mobile station performing communications using a shared channel, thereby maintaining the quality of the mobile station performing the communications using the shared channel.

As described above, according to the present invention, in the mobile communication system containing in a mixed manner the communications using a shared channel and the communications using a dedicated channel, call admission control can be performed while reserving necessary radio resources to satisfy the transmission data rate aimed by a mobile station performing communications using a shared channel, thereby maintaining the quality of the mobile station performing the communications using the shared channel.

DETAILED DESCRIPTION OF THE PREFERRED EMBODIMENTS

A mode for embodying the present invention is explained below by referring to the attached drawings. In the following explanation, each referenced figure shows the same reference numeral for the same component in other figures.

Mode for Embodying the Invention

The mode 1 for embodying the present invention is explained below by referring to the attached drawings.

Figure 1:
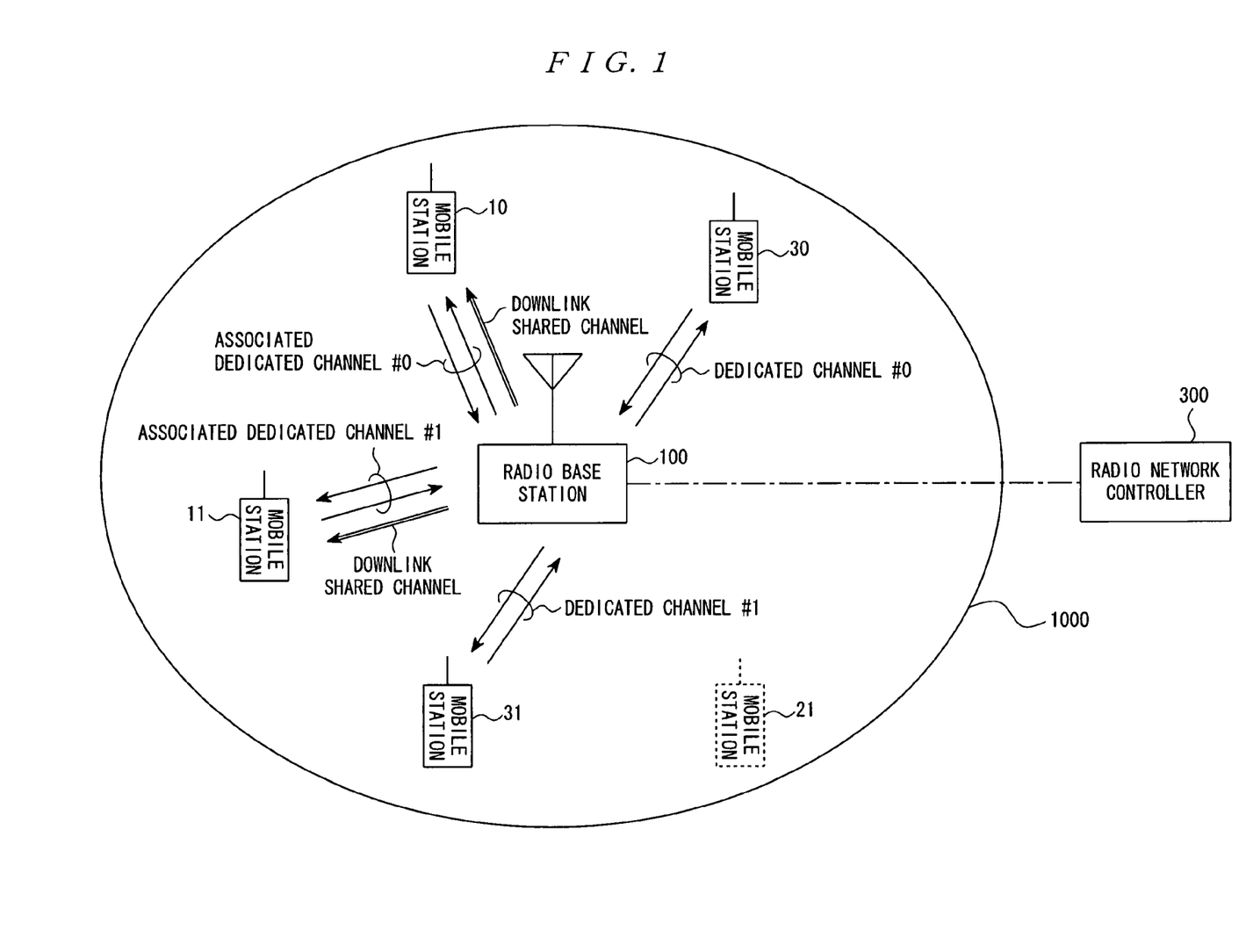
FIG. 1 shows an example of the configuration of the mobile communication system using the call admission control device according to a mode for embodying the present invention.

FIG. 1 shows an example of the configuration of the mobile communication system using the call admission control device according to a mode for embodying the present invention.

In FIG. 1, the mobile communication system includes a plurality of mobile stations 10 and 11 as mobile stations for performing communications using an HS (high speed) channel as a shared channel, a plurality of mobile stations 30 and 31 as mobile stations for performing communications using a dedicated channel, a mobile station 21 which is newly starting communications using a dedicated channel, a radio base station 100, and a radio network controller 300 for controlling them, and the above-mentioned release 5 system in the W-CDMA system is applied. The radio base station 100 and the radio network controller 300 realize the function as a call admission control device. A cell 1000 indicates an area in which the radio base station 100 can provide communications.

The mobile stations 10 and 11 are already in the state in which they are performing communications with the radio base station 100 in the cell 1000 using the HSDPA, and the mobile stations 30 and 31 are in the state in which they are performing communications with the radio base station 100 in the cell 1000 using a dedicated channel, and the mobile station 21 is in the state in which it is newly starting communications with the radio base station 100 in the cell 1000 using a dedicated channel.

An HS channel is a communication channel in the HSDPA, and the communications using an HS channel refer to the communications using the HSDPA. A communication channel in the HSDPA is explained below. In the downlink in the HSDPA, a high speed physical downlink shared channel HS-PDSCH shared by each of the mobile stations 10 to 12, a high speed shared control channel HS-SCCH shared by each mobile station, and an associated dedicated physical channel A-DPCH associated with the shared physical channel dedicated to each mobile station are used.

In the uplink, in addition to the uplink associated dedicated channel A-DPCH dedicated to each mobile station, a control channel (high speed dedicated physical control channel, HS-DPCCH) for the HSDPA dedicated to each mobile station is used.

In the downlink, along the downlink associated dedicated channel, a transmission power control command, etc. for the uplink associated dedicated channel is transmitted, and user data is transmitted along the shared physical channel. On the other hand, in the uplink, a pilot symbol and a power control command (TPC command) for downlink associated dedicated channel transmission are transmitted in addition to the user data along the uplink associated dedicated channel, and Channel Quality Indicator (CQI) being downlink quality information used for the AMCS (adaptive modulation/coding) and the scheduling, and Acknowledgements information for downlink shared channel HS-DSCH transmission are transmitted along the HS-DPCCH.

A dedicated channel practically refers to a DPCH (dedicated physical channel).

Hereinafter, since the mobile stations 10 and 11 performing communications using an HS channel have the same configurations, functions, and states, they are described as mobile stations n (n≧1) unless otherwise specified, and since the mobile stations 30 and 31 performing communications using a dedicated channel have the same configurations, functions, and states, they are described as mobile stations m (m≧1) unless otherwise specified. The mobile station 21 is used as an example of a mobile station in the state of newly starting communications using a dedicated channel.

Configuration Example of Radio Base Station

Figure 2:
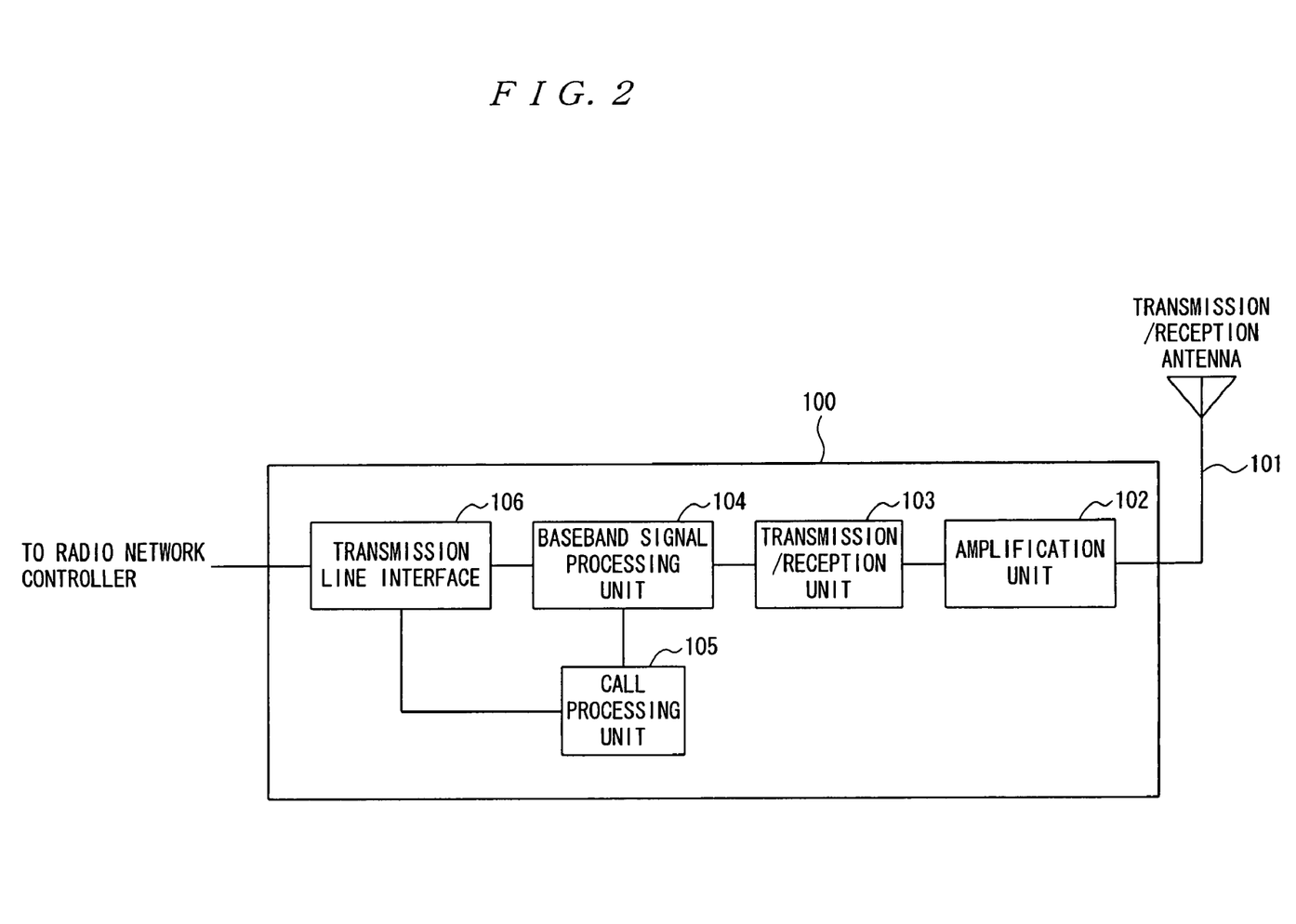
FIG. 2 is a block diagram of the function in an example of the configuration of the radio base station shown in FIG. 1.

FIG. 2 is a block diagram of the function showing an example of the configuration of the radio base station 100 shown in FIG. 1.

In FIG. 2, the radio base station 100 is constituted by a transmission/reception antenna 101, an amplification unit 102, a transmission/reception unit 103, a baseband signal processing unit 104, a call processing unit 105, and a transmission line interface 106. The downlink data is input from the radio network controller 300 positioned in the upper layer of the radio base station 100 to the baseband signal processing unit 104 through the transmission line interface 106. Relating to the data transmitted using an HS channel, the baseband signal processing unit 104 performs the process of re-transmission control (HARQ (hybrid ARQ)), scheduling, selection of a transmission format, channel coding, and a spreading process, and the data is transferred to the transmission/reception unit 103. Relating to the data transmitted using a dedicated channel, the baseband signal processing unit 104 performs channel coding and spreading processes, and the data is transferred to the transmission/reception unit 103. The transmission/reception unit 103 performs a frequency converting process of converting a baseband signal output from the baseband signal processing unit 104 into a radio frequency band. Then, the resultant signal is amplified by the amplification unit 102 and transmitted through the transmission/reception antenna 101.

On the other hand, as for the uplink data, the radio frequency signal received by the transmission/reception antenna 101 is amplified by the amplification unit 102, and the transmission/reception unit 103 frequency-converts it into a baseband signal. The baseband signal is processed by the baseband signal processing unit 104 for de-spreading, RAKE combining, and error correction decoding, and then transferred to the radio network controller through the transmission line interface 106.

The call processing unit 105 communicates a call processing control signal with the radio network controller, manages the status of the radio base station 100, and allocates resources.

Configuration Example of Baseband Signal Processing Unit

Figure 3:
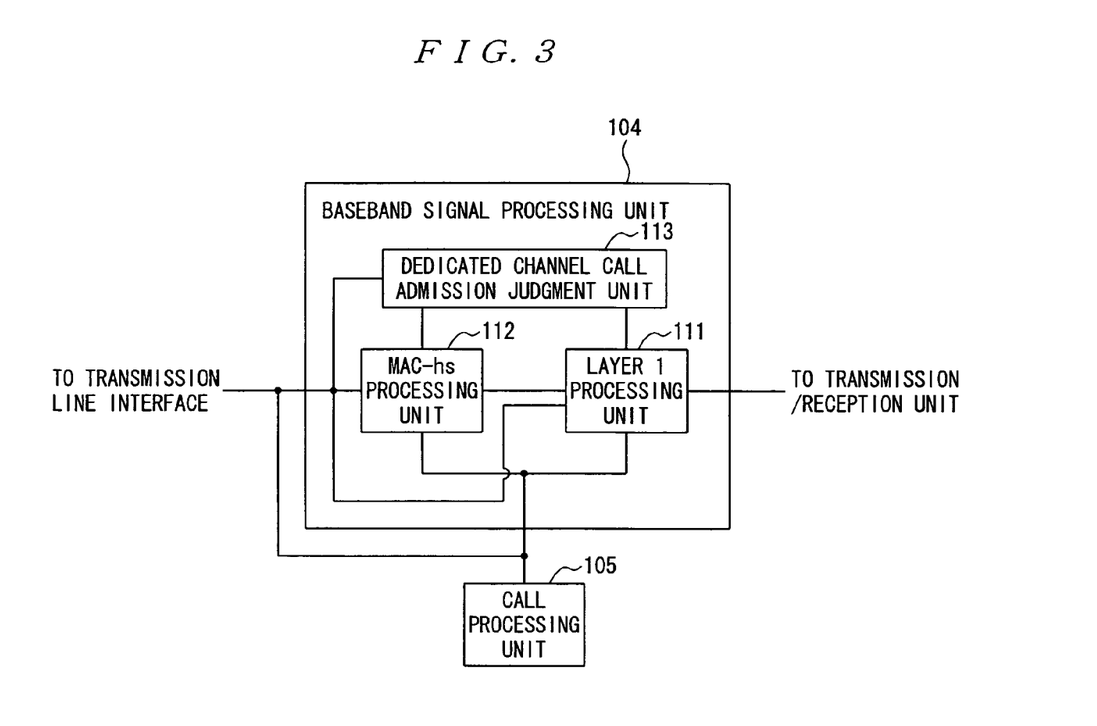
FIG. 3 is a block diagram showing an example of the configuration of the functions of the baseband signal processing unit shown in FIG. 2.

FIG. 3 is a block diagram showing an example of the configuration of the function of the baseband signal processing unit 104 shown in FIG. 2. In FIG. 3, the baseband signal processing unit 104 is constituted by a layer 1 processing unit 111, a MAC-hs (medium access control-HSDPA) processing unit 112, and a dedicated channel call admission judgment unit 113. Each of the layer 1 processing unit 111 and the MAC-hs processing unit 112 in the baseband signal processing unit 104 is connected to the call processing unit 105.

The layer 1 processing unit 111 performs channel coding of downlink data, channel decoding of uplink data, transmission power control of uplink and downlink dedicated channels, RAKE combining, and spreading/de-spreading processes. The layer 1 processing unit 111 receives the channel quality indicator (CQI) indicating the downlink radio channel quality reported along the HS-DPCCH from each mobile station performing communications using the HS channel, and notifies the MAC-hs processing unit 112 and the dedicated channel call admission judgment unit 113 of the information. The layer 1 processing unit 111 notifies the dedicated channel call admission judgment unit 113 of the transmission power of the dedicated channel of the downlink relating to the mobile station m and the transmission power of the associated dedicated channel of the downlink relating to the mobile station n.

In the MAC-hs processing unit 112, the HARQ (hybrid ARQ) through the downlink shared channel in the HSDPA, the scheduling for a packet waiting to be transmitted, the determination of a transmission format of a downlink shared channel in the AMC, etc. are performed. Also in the MAC-hs processing unit 112, the power Power available that can be allocated to the HS-PDSCH, and the number of codes Code available that can be allocated to the HS-PDSCH are calculated, and the result is noticed to the dedicated channel call admission judgment unit 113.

The dedicated channel call admission judgment unit 113 performs call admission judgment on whether or not the mobile station 21 can start communications using the dedicated channel in the cell 1000.

Example of the Configuration of the Dedicated Channel Call Admission Judgment Unit FIG. 4 is a block diagram showing an example of the configuration of the functions of the dedicated channel call admission judgment unit 113 shown in FIG. 3. In FIG. 3, the dedicated channel call admission judgment unit 113 is constituted by including the following function blocks.
(1) HS terminal radio channel quality acquisition unit 120
(2) HS terminal target transmission data rate setting unit 130
(3) HS terminal allocation power calculation unit 140
(4) new terminal initial transmission power calculation unit 150
(5) dedicated channel terminal transmission power calculation unit 160
(6) new call admission judgment unit 170

The HS terminal radio channel quality acquisition unit 120 of (1) above receives radio quality information $CQI_n$ indicating a downlink radio channel quality reported along HS-DPCCH from each mobile station n from the layer 1 processing unit 111, and receives the transmission power Power available that can be allocated to the HS-PDSCH, and the number of codes Code available that can be allocated to the HS-PDSCH from the MAC-hs processing unit 112. The HS terminal radio channel quality acquisition unit 120 calculates the amount of data Rn (that is, the value indicating the radio channel quality) that can be transmitted in 1 TTI (transmission time interval) relating to the mobile station n from the radio quality information $CQI_n$, the transmission power Power available that can be allocated to the HS-PDSCH, and the number of codes Code available that can be allocated to the HS-PDSCH, and notifies the HS terminal allocation power calculation unit 140 of the amount of data Rn that can be transmitted in 1 TTI relating to the mobile station n. The amount of data Rn that can be transmitted in 1 TTI relating to the mobile station n refers to the amount of data estimated to be transmitted at a predetermined error rate from the radio quality information $CQI_n$, the transmission power Power available that can be allocated to the HS-PDSCH, and the number of codes Code available that can be allocated to the HS-PDSCH. For example, when the predetermined error rate is 10%, the error rate obtained when the base station transmits a packet having the amount of data of Rn in 1 TTI to the mobile station n is about 10%.

An example of a method of calculating the amount of data Rn that can be transmitted in 1 TTI relating to the mobile station n is shown below.

First, the HS terminal radio channel quality acquisition unit 120 holds a reference table TF_Related_TBS (number of codes that can be allocated to the HS-PDSCH, CQI value) whose amount of data estimated to be transmitted at a predetermined error rate can be obtained from the number of codes Code_available that can be allocated to the HS-PDSCH and the CQI value.

Example of the Configuration of the Reference Table

Figure 5:
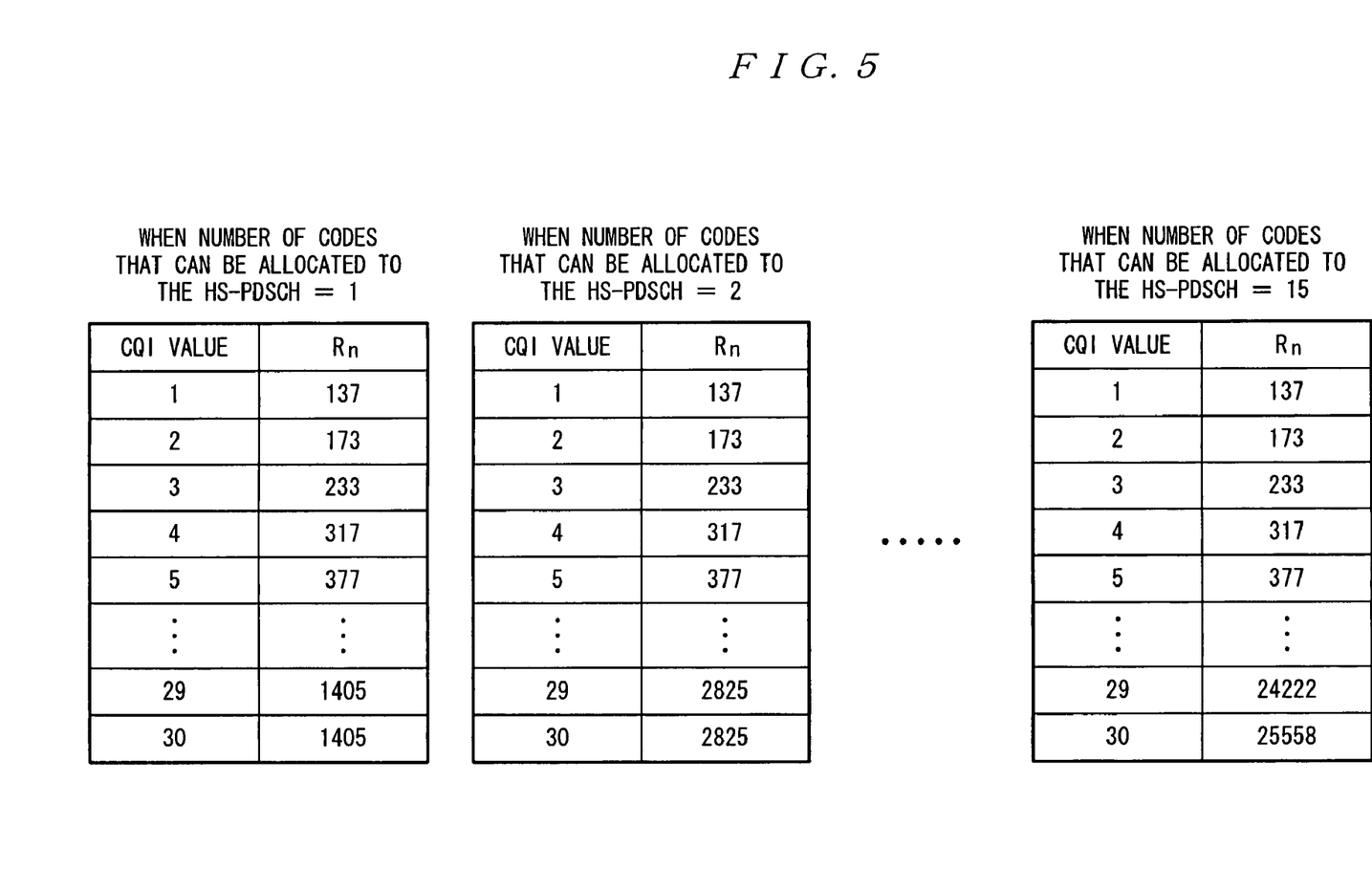
FIG. 5 shows an example of a reference table on which an amount of data that can be transmitted at a predetermined error rate can be obtained from the number of codes that can be allocated to the HS-PDSCH and the CQI value stored in the dedicated channel call admission judgment unit.

FIG. 5 shows a part of the reference table TF_Related_TBS (number of codes that can be allocated to the HS-PDSCH, CQI value).

Since the number of codes that can be allocated to the HS-PDSCH is 1 to 15, each table including 15 codes is held.

By the reference table TF_Related_TBS (number of codes that can be allocated to the HS-PDSCH, CQI value) shown in FIG. 5, the value of the amount of data Rn is obtained from the number of codes Code_available that can be allocated to the HS-PDSCH and the CQI value.

There is a maximum number of codes that can be received as one of the capabilities of a mobile station. For example, when the maximum number of codes that can be received is 5, the mobile station cannot receive six or higher codes of the HS-PDSCH. Therefore, when the number of codes Code_available that can be allocated to the HS-PDSCH is higher than the maximum number of codes that can be received by the mobile station, the number of codes Code_available that can be allocated to the HS-PDSCH is replaced with the maximum number of codes that can be received by the mobile station, and the reference table TF_Related_TBS (number of codes that can be allocated to the HS-PDSCH, CQI value) can be referred to. Furthermore, in the example above, the amount of data Rn that can be transmitted in 1 TTI relating to the mobile station n is obtained from the number of codes Code_available that can be allocated to the HS-PDSCH and the CQI value. However, it is also possible that the table indicates the relationship among the CQI value, the amount of data Rn that can be transmitted in 1 TTI, the amount of code resources, the modulation system, and the power offset of the power resource.

Next, since the radio quality information CQI is a value calculated by the mobile station n by assuming that the transmission power of the HS-PDSCH is $(P_{CPICH}+\Gamma)$, the HS terminal radio channel quality acquisition unit 120 calculates the value $CQI\_adjust_n$ with the transmission power Power available that can be allocated to the HS-PDSCH taken into account from the radio quality information $CQI_n$ by the following equation (1).

$$CQI\_adjust_n = CQI_n + \text{Power\_available} - (P_{CPICH}+\Gamma) \quad (1)$$

Where, in the equation (1) above, $P_{CPICH}$ indicates the transmission power of the CPICH, and $\Gamma$ indicates a power difference value between the CPICH and HS-PDSCH used when the mobile station calculates the CQI, that is, the measurement power offset.

Thus, from the $CQI\_adjust_n$ and the number of codes Code_available that can be allocated to the HS-PDSCH, using the reference table TF_Related_TBS (number of codes that can be allocated to the HS-PDSCH, CQI value), the amount of data Rn that can be transmitted in 1 TTI relating to the mobile station n is calculated by the equation (2) below.

$$Rn = \text{Table\_TF\_Related\_TBS (Code\_available, } CQI\_adjust_n) \quad (2)$$

By the equation (2), in calculating the amount of data Rn that can be transmitted in 1 TTI relating to the mobile station n, the $CQI\_adjust_n$ can be a value obtained by averaging the values of the $CQI\_adjust_n$ for each TTI in predetermined averaging region. For example, amount of data Rn can be calculated using $CQI\_adjust_n$ obtained by averaging for three seconds the values of $CQI\_adjust_n$ for each TTI. Otherwise, the amount of data Rn that can be transmitted in 1 TTI relating to the mobile station n can be a value obtained by averaging the values of Rn for each TTI in a predetermined averaging region. For example, the value at each TTI can be averaged in three seconds, and the result can be given to the HS terminal allocation power calculation unit 140 as the amount of data Rn that can be transmitted in 1 TTI relating to the mobile station n.

The HS terminal target transmission data rate setting unit 130 of (2) above sets an existing terminal target transmission data rate $_{target}R^{(connect)}$ aimed by the mobile station n which is performing communications in the cell 1000, and notifies the HS terminal allocation power calculation unit 140 of the HS terminal target transmission data rate $_{target}R^{(connect)}$.

The HS terminal target transmission data rate $_{target}R^{(connect)}$ aimed by the mobile station n can be constituted to be set for each service type, each contract type, each terminal type, each cell type, or for each priority class. For example, a service type indicates the type of service transmitted through a downlink packet, and includes, for example, a VoIP service, a voice service, a streaming service, an FTP (file transfer protocol) service, etc.

A contract type indicates the type of contract made by a user of a destination mobile station in a downlink packet, and includes, for example, a low class contract, a high class contract, etc.

A terminal type classifies the performance of a mobile station as a destination of a downlink packet, and includes a class according to the identification information about a mobile station, the presence/absence or type of the RAKE receiver function, equalizer, receive diversity, an interference canceller, etc., a receivable modulation system, the terminal performance such as the number of codes, the number of bits, etc. In the 3GPP specification, an HS-DSCH category is defined as a category class of a mobile station (refer to TS25.306 v5.12.0).

The cell type indicates the type of mode of a cell in which mobile stations as destinations of downlink packets are resident. For example, it includes a class according to the cell identification information, indoor or outdoor, suburbs or urban, high traffic region or a low traffic region, etc.

Furthermore, the priority class refers to the priority relating to generation of a downlink packet. For example, a downlink packet of a priority class having the first priority is transmitted on a priority basis over a downlink packet of the priority class having the second priority.

The HS terminal allocation power calculation unit 140 of (3) above receives the amount of data $R_n$ that can be transmitted in 1 TTI relating to the mobile station n from the HS terminal radio channel quality acquisition unit 120, and receives the HS terminal target transmission data rate $_{target}R^{(connect)}$ aimed by the mobile station n from the HS terminal target transmission data rate setting unit 130. It also receives from the MAC-hs processing unit 112 the transmission power Power_available that can be allocated to the HS-PDSCH. Then, it obtains the HS terminal allocated power $P_{HS\_req}$ to satisfy the HS terminal target transmission data rate $_{target}R^{(connect)}$ aimed by the mobile station n from the amount of data $R_n$ that can be transmitted in 1 TTI relating to the mobile station n and the HS terminal target transmission data rate $_{target}R^{(connect)}$ aimed by the mobile station n. Then, it notifies the new call admission judgment unit 170 of the HS terminal allocated power $P_{HS\_req}$.

For example, the HS terminal allocated power $P_{HS\_req}$ to satisfy the HS terminal target transmission data rate $_{target}R^{(connect)}$ aimed by the mobile station n is calculated by the equation (3) below from the amount of data Rn that can be transmitted in 1 TTI relating to the mobile station n and the HS terminal target transmission data rate $_{target}R^{(connect)}$ aimed by the mobile station n.

$$P_{HS\_req}=\text{Power\_available}\times\Sigma(_{target}R^{(connect)}/Rn)+\text{Power}_{HS-SCCH} \quad (3)$$

Where, in the equation (3), $\text{Power}_{HS\text{-}SCCH}$ indicates the transmission power of the HS-SCCH as a control channel in the HSDPA. Also, in the equation (3), $\Sigma$ is a sum of n. When there are a plurality of HS-SCCHs, the $\text{Power}_{HS\text{-}SCCH}$ is calculated with the transmission power of the plurality of HS-SCCHs taken into account.

The calculation of the HS terminal allocated power $P_{HS\_req}$ has to be calculated with the units of Rn and $_{target}R^{(connect)}$ taken into account. The explanation is given below by referring to a more practical example. Assume that the amount of data Rn that can be transmitted in 1 TTI relating to the mobile station n=3 is 2404 bits, and the HS terminal target transmission data rate $_{target}R^{(connect)}$ aimed by the mobile station n=3 is 64 kbps. Since 1TTI =2 ms in the HSDPA, the amount of data is calculated based on 64 kbps per TTI, and 128 bits/TTI is obtained. Therefore, the value of $_{target}R^{(connect)}/Rn$ when the mobile station n=3 is calculated as follows.

$$_{target}R^{(connect)}/Rn=128/2404=0.05324$$

Power_available in the equation (3) can be a momentary value, or an average value obtained in a predetermined averaging region.

In the above-mentioned example, the HS terminal allocated power $P_{HS\_req}$ is calculated by assuming that there is constantly data in the data queue relating to each mobile station. However, it can be considered in practice that there is a time when there is no data in the data queue. For example, when the mobile station n performs the FTP download, there is constantly data in the data queue of the mobile station n. However, when the i-mode® and the Web browsing are performed, data is generated at random, there is a time period when there is no data in the data queue of the mobile station n. Therefore, instead of calculating the HS terminal allocated power $P_{HS\_req}$ by assuming that there is constantly data in the data queue of each mobile station, the HS terminal allocated power $P_{HS\_req}$ can be calculated by considering the time rate at which there is data in the data queue. For example, the time rate at which there is data in the data queue is obtained relating to each mobile station, and the value $_{target}R^{(connect)}/Rn$ can be multiplied by the obtained time rate. In this case, the HS terminal allocated power $P_{HS\_req}$ can be obtained by the following equation (5).

$$P_{HS\_req}=\text{Power\_available}\times\Sigma\{(_{target}R^{(connect)}/Rn)\times Prob_n\}+\text{Power}_{HS\text{-}SCCH} \quad (5)$$

Where $Prob_n$ is a time rate at which there is data in the data queue relating to the mobile station n described above. In the equation (5), $\Sigma$ is a sum of n.

In the equation (3), however, it is assumed that there is one data queue for one mobile station, and the following equation (6) can also be used assuming that there are several data queues existing for one mobile station.

$$P_{HS\_req}=\text{Power\_available}\times\Sigma(_{target}R^{(connect)}/Rn,k)+\text{Power}_{HS\text{-}SCCH} \quad (6)$$

Where, in the equation (6), the subscript "k" is an index indicative of the type of data queue. In the equation (6), $\Sigma$ is a sum relating to n and k.

The above-mentioned data queue is referred to as a priority queue in the 3GPP specification.

The new terminal initial transmission power calculation unit 150 of (4) above receives from the radio network controller 300 through the transmission line interface 106 the CPICH Ec/N0 reported by the mobile station 21, and determines the initial transmission power $P_{initial}$ of the dedicated channel through which the mobile station 21 is newly starting communications based on the CPICH Ec/N0. For example, the new terminal initial transmission power calculation unit 150 can determine the initial transmission power $P_{initial}$ of the dedicated channel based on the CPICH Ec/N0, the downlink target SIR, the orthogonalization coefficient, the spreading factor, and the CPICH power. Furthermore, for example, the new terminal initial transmission power calculation unit 150 can set a predetermined fixed value as the initial transmission power $P_{initial}$ of a dedicated channel. Then, it notifies the new call admission judgment unit 170 of the initial transmission power $P_{initial}$ of the dedicated channel through which the mobile station 21 is newly starting the communications.

The dedicated channel terminal transmission power calculation unit 160 of (5) above receives from the layer 1 processing unit 111 the transmission power of the dedicated channel of the downlink relating to the mobile station m which is performing communications using the dedicated channel in the cell 1000, and the transmission power of the associated dedicated channel of the downlink relating to the mobile station n using an HS channel in the cell 1000. Then, it calculates the total value $Power_{DPCH}$ of the transmission power of the dedicated channels of all downlinks set in the cell 1000, and notifies the new call admission judgment unit 170 of the value.

For example, the total value $Power_{DPCH}$ of the dedicated channels of all downlinks set in the cell 1000 is calculated by the equation (7) below.

$$Power_{DPCH} = \Sigma Power_{n, A\text{-}DPCH} + \Sigma Power_{m, DPCH} \quad (7)$$

Where $\Sigma$ in the first term on the right side is a sum of n, and $\Sigma$ in the second term on the right side is a sum of m. $Power_{n, A\text{-}DPCH}$, $Power_{m, DPCH}$ respectively indicate the transmission power of the A-DPCH of the mobile station n, and the transmission power of the dedicated channel of the mobile station m. Furthermore, a momentary value or an average value in a predetermined averaging region can be used for the above-mentioned $Power_{n, A\text{-}DPCH}$ and $Power_{m, DPCH}$.

The new call admission judgment unit 170 of (6) above receives from the HS terminal allocation power calculation unit 140 the HS terminal allocated power $P_{HS\_req}$ to satisfy the HS terminal target transmission data rate $R_{target}^{(connect)}$ aimed by the mobile station n, receives the initial transmission power $P_{initial}$ of the dedicated channel through which the mobile station 21 is newly starting communications from the new terminal initial transmission power calculation unit 150, and receives from the dedicated channel terminal transmission power calculation unit 160 the total value $Power_{DPCH}$ of the transmission power of the dedicated channel of all downlinks set in the cell 1000. Then, based on the $P_{HS\_req}$, $P_{initial}$, and $Power_{DPCH}$, it is judged whether or not the mobile station 21 can newly start communications using the dedicated channel in the cell 1000, and the judgment result is given to the radio network controller 300 through the transmission line interface 106.

Described below is an example of the method for the new call admission judgment unit 170 judging whether or not the mobile station 21 can newly start communications using the dedicated channel in the cell 1000 based on the $P_{HS\_req}$, $P_{initial}$, and $Power_{DPCH}$.

For example, the new call admission judgment unit 170 calculates the necessary total transmission power $P_{total}$ by the following equation (8), determines that the mobile station 21 can newly start communication using a dedicated channel in the cell 1000 when the necessary total transmission power $P_{total}$ is lower than a predetermined power threshold value $\Delta$, and determines that the mobile station 21 cannot newly start communication using a dedicated channel in the cell 1000 when the necessary total transmission power $P_{total}$ is equal to or higher than a predetermined power threshold value $\Delta$.

$$P_{total} = P_{comon} + P_{HS\_req} + Power_{DPCH} + P_{initial} \quad (8)$$

Where $P_{comon}$ is a total value of the transmission power of common channels such as the CPICH, PCCPCH, SCCPCH, SCH, etc. For example, the predetermined power threshold value $\Delta$ can be set as 0.5 dB smaller than the maximum transmission power of the radio base station 100. That is, when the maximum transmission power of the radio base station 100 is 43 dBm, the value of the predetermined power threshold value $\Delta$ is 42.5 dBm.

The new call admission judgment unit 170 can also adjust the predetermined power threshold value $\Delta$ based on the number of mobile stations performing communications using the HS channel and the number of mobile stations performing communications using the dedicated channel. For example, when the ratio of the number of mobile stations performing communication using the HS channel to the number of mobile stations performing communications using the dedicated channel is 9:1, the number of mobile stations performing communications using the dedicated channel is low. Therefore, it is determined that the fluctuation of the total transmission power of the radio base station 100 is low, and the predetermined power threshold value can be set large. Otherwise, when the ratio of the number of mobile stations performing communication using the HS channel to the number of mobile stations performing communications using the dedicated channel is 1:9, the number of mobile stations performing communications using the dedicated channel is high. Therefore, it is determined that the fluctuation of the total transmission power of the radio base station 100 is high, and the predetermined power threshold value can be set small.

In the example above, the ratio of the number of mobile stations performing communications using the HS channel to the number of mobile stations performing communications using the dedicated channel is used, but ratio can be replaced with the ratio of the transmission power used by the HS channel to the transmission power used by the dedicated channel, or the ratio of the code resources used by the HS channel to the code resources used by the dedicated channel.

Example of Configuration of Radio Network Controller

Figure 6:
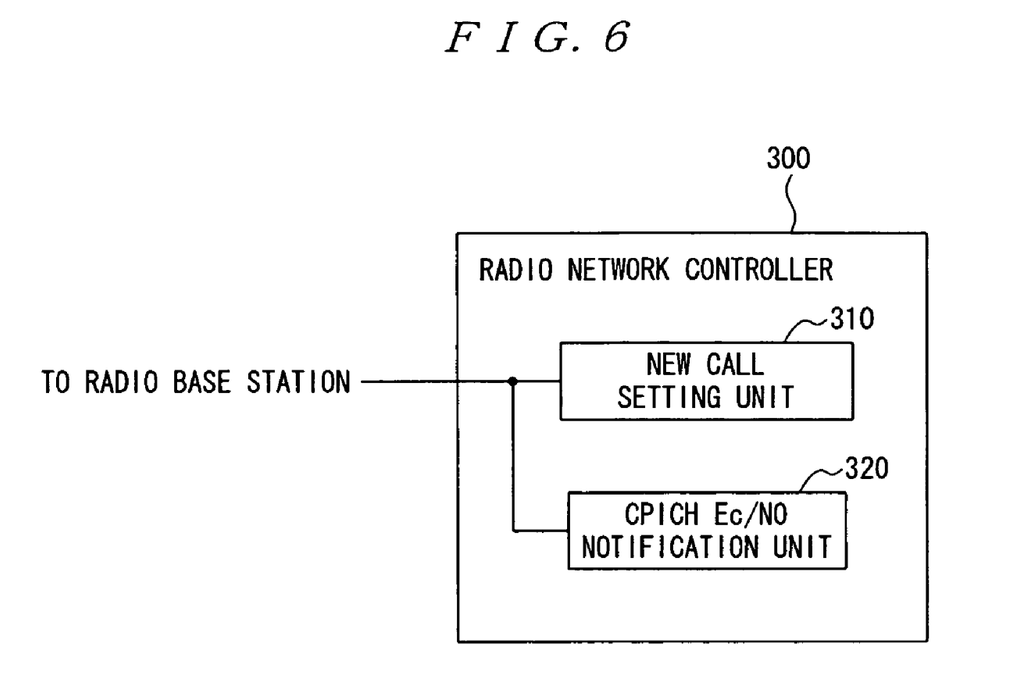
FIG. 6 is a block diagram showing an example of the configuration of the functions of the radio network controller shown in FIG. 1.

FIG. 6 is a block diagram of the functions showing an example of the configuration of the functions of the radio network controller 300. In FIG. 6, in the functions of the radio network controller 300, only the portions relating to the function of setting a new call and the function of notifying the radio base station 100 of the CPICH Ec/N0 of the mobile station 21 are described, and other functions are omitted. The radio network controller 300 is provided with the new call setting unit 310 and the CPICH Ec/N0 notification unit 320.

The new call setting unit 310 receives from the new call admission judgment unit 170 in the radio base station 100 a judgment result as to whether or not the mobile station 21 can newly start communications using a dedicated channel in the cell 1000. The new call setting unit 310 performs a process for the mobile station 21 starting communications using a dedicated channel in the cell 1000 when the judgment result indicates that the mobile station 21 can newly start communications using a dedicated channel in the cell 1000. That is, a control signal for start of communications is issued to the radio base station 100 and the mobile station 21, thereby setting the communications.

The new call setting unit 310 on the other hand, does not perform a process for the mobile station 21 starting communications using a dedicated channel in the cell 1000 when the judgment result indicates that the mobile station 21 cannot newly start communications using a dedicated channel in the cell 1000. In this case, for example, the new call setting unit 310 does not perform the process for starting communications using a dedicated channel, but can perform the process for starting communications using the FACH (Forward Access Channel). In this case, the mobile station 21 performs communications using the FACH in the cell 1000. Otherwise, the new call setting unit 310 does not perform the process for starting communications using a dedicated channel, but can notify the mobile station 21 of the information that the communications using a dedicated channel cannot be performed. In this case, the communication the mobile station 21 tries to start becomes a lost call.

In the process above, the new call admission judgment unit 170 in the radio base station 100 judges whether or not the mobile station 21 can newly start communications using a dedicated channel, and performs call admission control as to whether or not the new call setting unit 310 in the radio network controller 300 can practically establish communications using a dedicated channel, but the present invention is not limited to this mode for embodying the invention. That is, the radio base station 100 can judge whether or not communications using a dedicated channel can be started and can establish communications using a dedicated channel, or the radio network controller 300 can judge whether or not communications using a dedicated channel can be started and can establish communications using a dedicated channel.

The CPICH Bc/N0 notification unit 320 notifies the new terminal initial transmission power calculation unit 150 in the radio base station 100 of the value of the CPICH Ec/N0 mapped and reported on the RACH from the mobile station 21.

In the present embodiment, the radio network controller 300 receives the CPICH Ec/N0 reported from the mobile station 21, and notifies the radio base station 100 of the information, but the radio base station 100 can directly receive the CPICH Ec/N0 reported from the mobile station 21.

Call Admission Control Method

The method for controlling call admission according to a mode for embodying the present invention is explained below by referring to the flowchart shown in FIG. 7. The control method is realized by the dedicated channel call admission judgment unit 113 and the new call setting unit 310, etc.

Figure 7:
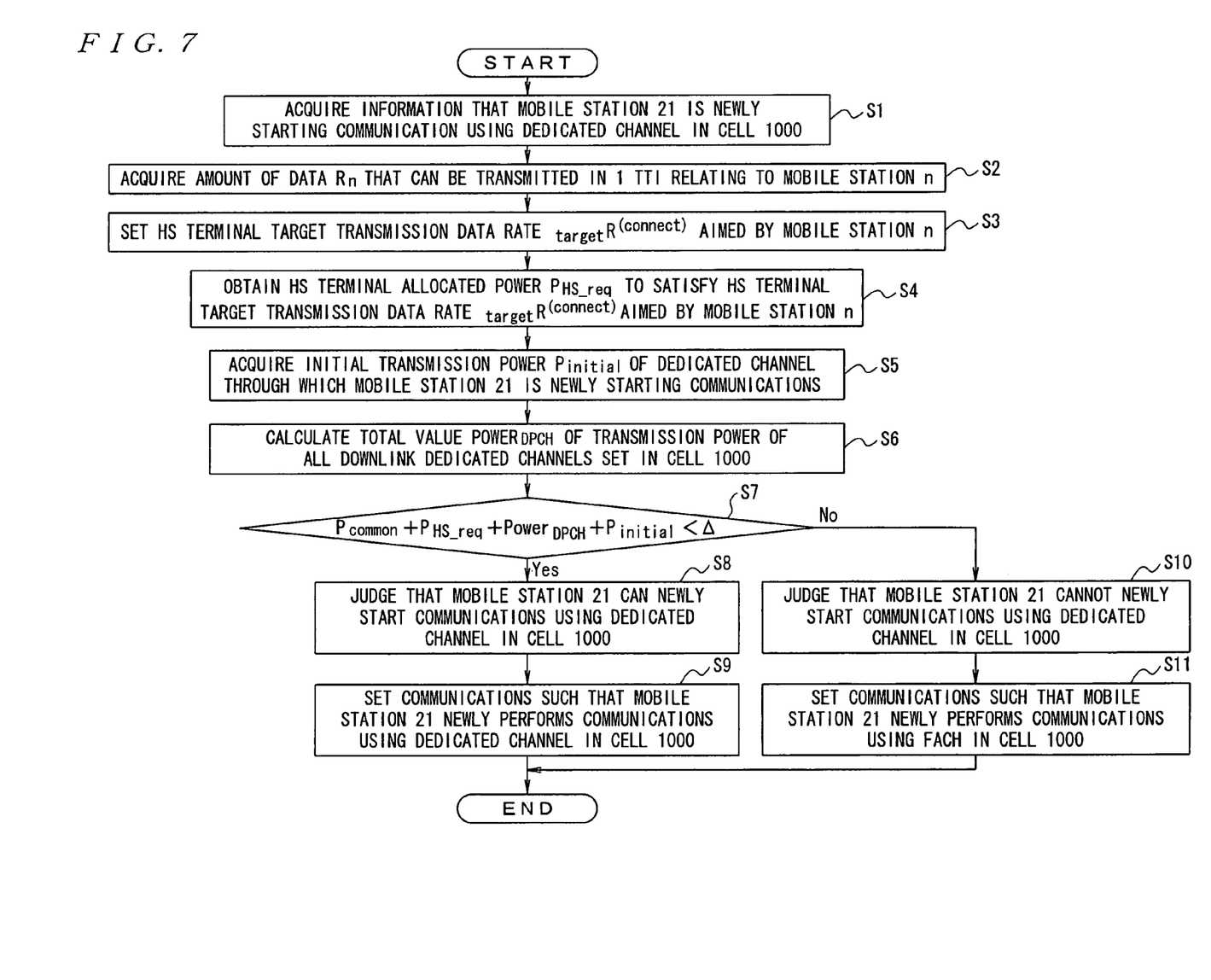
FIG. 7 is a flowchart showing the call admission control method in a mode for embodying the present invention.

In FIG. 7, first in step S1, the dedicated channel call admission judgment unit 113 acquires the information that the mobile station 21 is newly starting communications using a dedicated channel in the cell 1000.

In step S2, the HS terminal radio channel quality acquisition unit 120 acquires the amount of data Rn that can be transmitted in 1 TTI relating to the mobile station n.

In step S3, the HS terminal target transmission data rate setting unit 130 sets the HS terminal target transmission data rate $_{target}R^{(connect)}$ aimed by the mobile station n.

In step S4, the HS terminal allocation power calculation unit 140 calculates the HS terminal allocated power $P_{HS\_req}$ to satisfy the HS terminal target transmission data rate $_{target}R^{(connect)}$ aimed by the mobile station n.

In step S5, the new terminal initial transmission power calculation unit 150 calculates the initial transmission power $P_{initial}$ of a dedicated channel through which the mobile station 21 is to newly start communications.

In step S6, the dedicated channel terminal transmission power calculation unit 160 calculates the total value Power-$_{DPCH}$ of the transmission power of all downlink dedicated channels set in the cell 1000.

In step S7, the new call admission judgment unit 170 judges whether or not $P_{comon}+P_{HS\_req}+Power_{DPCH}+P_{initial}$ is lower than a predetermined threshold value $\Delta$. If it judges that $P_{comon}+P_{HS\_req}+Power_{DPCH}+P_{initial}$ is lower than the predetermined threshold value $\Delta$, control is passed to step S8. If it judges that $P_{comon}+P_{HS\_req}+Power_{DPCH}+P_{initial}$ is not lower than the predetermined threshold value $\Delta$, control is passed to step S10.

In step S8, the new call admission judge unit 170 judges that the mobile station 21 can newly start the communications using a dedicated channel.

In step S9, the new call setting unit 310 performs setting communications so that the mobile station 21 can newly start communications using a dedicated channel.

In step S10, the new call admission judge unit 170 judges that the mobile station 21 cannot newly start communications using a dedicated channel.

In step S11, the new call setting unit 310 performs setting so that the mobile station 21 can newly start communications using FACH. The new call setting unit 310 judges that the mobile station 21 cannot newly start communications in the cell 1000 instead of performing settings so that the mobile station 21 can newly start communications using FACH in the cell 1000, and can perform the process of not performing settings of any communications. In this case, the communications to be performed by the mobile station 21 refer to lost calls.

In the description above, the processes in steps S2 to S6 are performed when the mobile station 21 newly starts communications using a dedicated channel in the cell 1000. However, the processes in steps S2 to S6 can be performed at predetermined time intervals. For example, the processes in steps S2 to S6 can be performed every three second by setting 3 seconds as a judgment period. In this case, the processes in S2 to S6 are performed in the background, and the result of the processes in steps S2 to S6 is referred to when the processes in steps S7 to S11 are performed.

The effect of judging in step S7 whether or not $P_{comon}+P_{HS\_req}+Power_{DPCH}+P_{initial}$ is lower than the predetermined threshold value $\Delta$ is explained below. By performing the call admission control based on the total value of the transmission power of the common channel and the dedicated channel actually used in communications, the initial transmission power of the dedicated channel newly used for transmission, and the transmission power $P_{HS\_req}$ to satisfy the target transmission data rate $_{target}R^{(connect)}$ aimed by the mobile station n, the quality of the mobile station performing communications using an HS channel as a shared channel can be maintained. For example, when the target transmission data rate $_{target}R^{(connect)}$ is set to 64 kbp, the mobile station n reserves the transmission power to satisfy 64 kbps, and it is possible to guarantee to a certain extent that the transmission data rate of the mobile station n performing communications using an HS channel in the cell 1000 is 64 kbps or higher. That is, it is possible to perform call admission control with the transmission data rate aimed by the mobile station performing communications using an HS channel taken into account.

The above-mentioned reference table TF_Related_TBS (the number of codes that can be allocated to the HS-PDSCH, CQI value), the existing terminal target transmission data rate $_{target}R^{(connect)}$ aimed by the mobile station n, and a predetermined threshold value $\Delta$ can be set depending on the specification from a remote apparatus, for example, an upper node of the radio base station 100 (for example, a radio network controller, a server of a core network) via the transmission line interface 106 in the distance. Otherwise, the reference table TF_Related_TBS (the number of codes that can be allocated to the HS-PDSCH, CQI value), the HS terminal target transmission data rate $_{target}R^{(connect)}$ aimed by the mobile station n, and a predetermined threshold value Δ are maintained as the internal data of the radio base station 100, and can be set by referring to the values of the internal data.

In the present mode for embodying the present invention described above, the dedicated channel call admission control can be performed with a target transmission data rate aimed by a mobile station performing communications using the HSDPA taken into account.

The dedicated channel call admission judgment unit 113 is constituted by, for example, a CPU, a digital signal processor (DSP), or a programmable device capable of rewriting a program such as an FPGA (Field Programmable Gate Array), etc. In a predetermined memory area, the above-mentioned program is stored, and parameters (TF_Related_TBS (the number of codes that can be allocated to the HS-PDSCH, CQI value), $_{target}R^{(connect)}$, Δ) are downloaded and rewritten. At this time, the parameter (TF_Related_TBS (the number of codes that can be allocated to the HS-PDSCH, CQI value), $_{target}R^{(connect)}$, Δ) can be downloaded from the upper node of the radio base station, or a terminal I/F (external interface function) is provided for the dedicated channel call admission judgment unit 113 so that the parameters (TF_Related_TBS (the number of codes that can be allocated to the HS-PDSCH, CQI value), $_{target}R^{(connect)}$, Δ) can be directly read from the terminal.

Each function block of the dedicated channel call admission judgment unit 113 described above can be divided by hardware, or divided as software by the program on a processor.

The above embodiment is described relating to the high speed packet transmission system HSDPA in the 3GPP (Third-Generation Partnership Project). However, the present invention is not limited to the HSDPA, but can also be applied to a high speed packet transmission system in other mobile communication systems. For example, the high speed packet transmission system provided by the LTE (Long Term Evolution) of 3GPP, the high speed packet transmission system in the cdma 2000 1×EV-DV and TDD system in the 3GPP2 (Third-Generation Partnership Project 2), etc. can be the other high speed packet transmission systems. In the example above, it is applied to the packet transmission system of the downlink, but it also can be applied to a packet transmission system of the uplink. For example, HSUPA (High Speed Uplink Packet Access) can be an uplink packet transmission system in the 3GPP.

In the example described above, call admission control is applied by the mobile station 21 starting communications using a dedicated channel in the cell 1000, but the call admission control can also be applied when the mobile station 21 is starting communications using a shared channel in the cell 1000. That is, when the mobile station 21 is starting the communications using a shared channel in the cell 1000, the call admission control can be applied to the downlink associated dedicated channel A-DPCH of the mobile station 21.

The present invention can be used in call admission control in the mobile communication system containing in a mixed manner a dedicated channel and a shared channel.

What is claimed is:

1. A call admission control device in a mobile communication system including n mobile stations performing communications using a shared channel and m mobile stations performing communications using a dedicated channel, where n is an integer of 2 or more and m is an integer of 2 or more, the device comprising:

radio channel quality acquisition means for acquiring a value indicating a radio channel quality of the n mobile stations performing communications using the shared channel;

target transmission data rate setting means for setting a target transmission data rate of the n mobile stations performing communications using the shared channel;

necessary transmission power calculation means for calculating necessary transmission power for the n mobile stations performing communications using the shared channel to satisfy the target transmission data rate based on the value indicating the radio channel quality of the n mobile stations performing communication using the shared channel and the target transmission data rate;

initial transmission power setting means for setting initial transmission power of a mobile station which newly starts communications using a dedicated channel;

dedicated channel transmission power acquisition means for acquiring transmission power of the m mobile stations performing communications using the dedicated channel; and new mobile station admission means for controlling admission of a call from a mobile station to newly start performing communications using the dedicated channel, based on a comparison result between a predetermined threshold value and a sum of: a total value of the transmission power of a common channel; the necessary transmission power for the n mobile stations performing communication using the shared channel to satisfy the target transmission data rate; the initial transmission power of the mobile station to newly start communications using the dedicated channel; and the transmission power of the m mobile stations performing communications using the dedicated channel;

wherein the value indicating the radio channel quality is a data amount which is estimated from radio quality of a downlink, and a power resource and a code resource in the downlink that the data amount can be transmitted at a predetermined error rate.

2. The call admission control device according to claim 1, wherein:

the necessary transmission power calculation means calculates, $P_{HS\_req}$=Power_available×Σ($_{target}R^{(connect)}$/Rn)+Power$_{HS-SCCH}$, where Σ is a sum of n, the necessary transmission power $P_{HS\_req}$ for the n mobile stations to attain the target transmission data rate based on the value Rn indicating the radio channel quality of the n mobile stations, a target transmission data rate $_{target}R^{(connect)}$ of the n mobile stations, power Power_available that can be allocated to the shared channel, and transmission power Power$_{HSHS-SCCH}$ of a control channel for the shared channel.

3. The call admission control device according to claim 1, wherein:

the necessary transmission power calculation means calculates, by $P_{HS\_req}$=Power_available×Σ($_{target}R^{(connect)}$/Rn×Prob$_n$)+Power$_{HS-SCCH}$, where Σ is a sum of n, the necessary transmission power $P_{HS\_req}$ for the n mobile stations to attain the target transmission data rate based on the value Rn indicating the radio channel quality of the n mobile stations, a time rate Prob$_n$ at which data to be transmitted to the mobile station n, a target transmission data rate $_{target}R^{(connect)}$ of the n mobile stations, power Power_available that can be allocated to the shared channel, and transmission power Power$_{HS-SCCH}$ of a control channel for the shared channel.

4. The call admission control device according to claim 1, wherein:
the new mobile station admission means admits the call from the mobile station to newly start performing communications using the dedicated channel, based on a comparison result between a predetermined threshold value and a sum of $P_{comon}+P_{HS\_req}+\text{Power}_{DPCH}+P_{initial}$, where $P_{comon}$ is the total value of the transmission power of the common channel, $P_{HS\_req}$ is the necessary transmission power for the n mobile stations to attain the target transmission data rate, $\text{Power}_{DPCH}$ is a total value of the transmission power of the m mobile stations performing communications using the dedicated channel, and $P_{initial}$ is the initial transmission power of the mobile station to newly start communications using the dedicated channel.

5. The call admission control device according to claim 1, wherein:
the target transmission data rate setting means sets a target transmission data rate of the n mobile stations depending on at least one of each service type, each contract type, each terminal type, each user, each cell, each priority class.

6. The call admission control device according to claim 4, wherein:
the new mobile station admission means sets the predetermined threshold value based on one of:
a ratio of the number of mobile stations performing communications using the shared channel to the number of mobile stations performing communications using the dedicated channel;
a ratio of the transmission power used by the shared channel to the transmission power used by the dedicated channel; and
a ratio of code resources used by the shared channel to code resources used by the dedicated channel.

7. A call admission control method for use in a mobile communication system including n mobile stations performing communications using a shared channel and m mobile stations performing communications using a dedicated channel, where n is an integer of 2 or more and m is an integer of 2 or more, the method comprising:
a step of acquiring a value indicating a radio channel quality of the n mobile stations performing communications using the shared channel;
a step of setting a target transmission data rate of the n mobile stations performing communications using the shared channel;
a step of calculating a necessary transmission power for the n mobile stations performing communications using the shared channel to satisfy the target transmission data rate based on the value indicating the radio channel quality of the n mobile stations performing communication using the shared channel and the target transmission data rate;
a step of setting an initial transmission power of a mobile station to newly start communications using a dedicated channel;
a step of acquiring transmission power of the m mobile stations performing communications using the dedicated channel; and
a step of controlling admission of a call from a mobile station to newly start performing communications using the dedicated channel, based on a comparison result between a predetermined threshold value and a sum of: a total value of the transmission power of a common channel; the necessary transmission power for the n mobile stations performing communication using the shared channel to satisfy the target transmission data rate; the initial transmission power of the mobile station to newly start communications using the dedicated channel; and the transmission power of the m mobile stations performing communications using the dedicated channel;
wherein the value indicating the radio channel quality is a data amount which is estimated from radio quality of a downlink, and a power resource and a code resource in the downlink that the data amount can be transmitted at a predetermined error rate.

* * * * *